(12) United States Patent
Arterburn et al.

(10) Patent No.: US 6,202,449 B1
(45) Date of Patent: Mar. 20, 2001

(54) STRAND POSITIONING APPARATUS

(75) Inventors: Russell D. Arterburn; Larry Edward Howard; John J. Dembowski, all of Athens, TN (US); Randall Clark Bascom, Waseon, OH (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/305,157

(22) Filed: May 4, 1999

Related U.S. Application Data

(63) Continuation-in-part of application No. 08/960,119, filed on Oct. 27, 1997, now Pat. No. 5,935,289, which is a continuation of application No. 08/604,695, filed on Feb. 21, 1996, now abandoned, which is a continuation-in-part of application No. 08/296,212, filed on Aug. 25, 1994, now abandoned.

(51) Int. Cl.[7] .................................................. C03B 37/03
(52) U.S. Cl. .............................................. 65/500; 65/533
(58) Field of Search ............................... 65/453, 500, 533

(56) References Cited

U.S. PATENT DOCUMENTS

| | | | | |
|---|---|---|---|---|
| 3,041,664 | * | 7/1962 | Green | 65/500 |
| 3,109,602 | * | 11/1963 | Smith | 65/500 |
| 3,482,953 | * | 12/1969 | Bohy | 65/500 |
| 3,506,419 | * | 4/1970 | Smith | 65/500 |
| 4,036,622 | * | 7/1977 | Carroll | 65/500 |
| 4,309,202 | * | 1/1982 | Barbhoo | 65/425 |
| 4,415,347 | * | 11/1983 | Malinge | 65/500 |

* cited by examiner

Primary Examiner—John Hoffmann
(74) Attorney, Agent, or Firm—John H. Miller

(57) ABSTRACT

An apparatus for receiving and automatically moving a moving strand of fibers from a starting position to any one of a plurality of predetermined positions in a multi-grooved separator roll is disclosed. This apparatus is particularly in processes of making continuous fiber products from molten material and replaces a manual operation that presented safety problems.

12 Claims, 10 Drawing Sheets

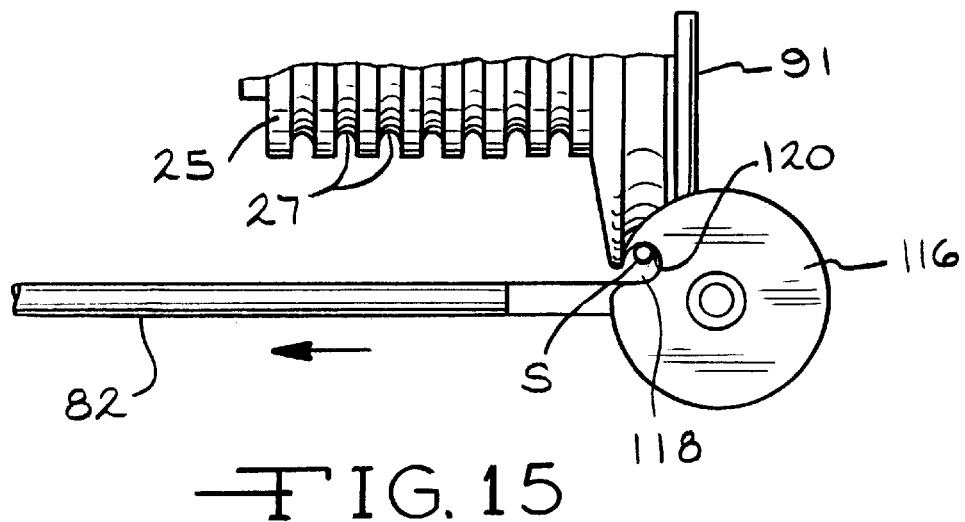
FIG. 15
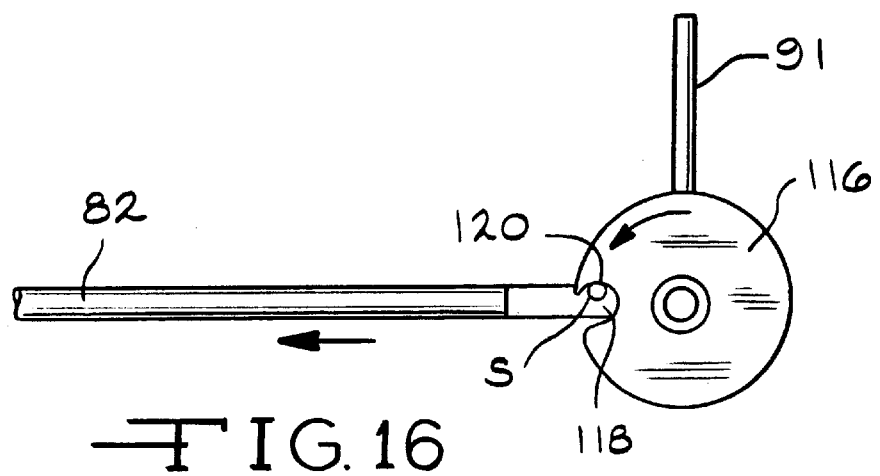
FIG. 16
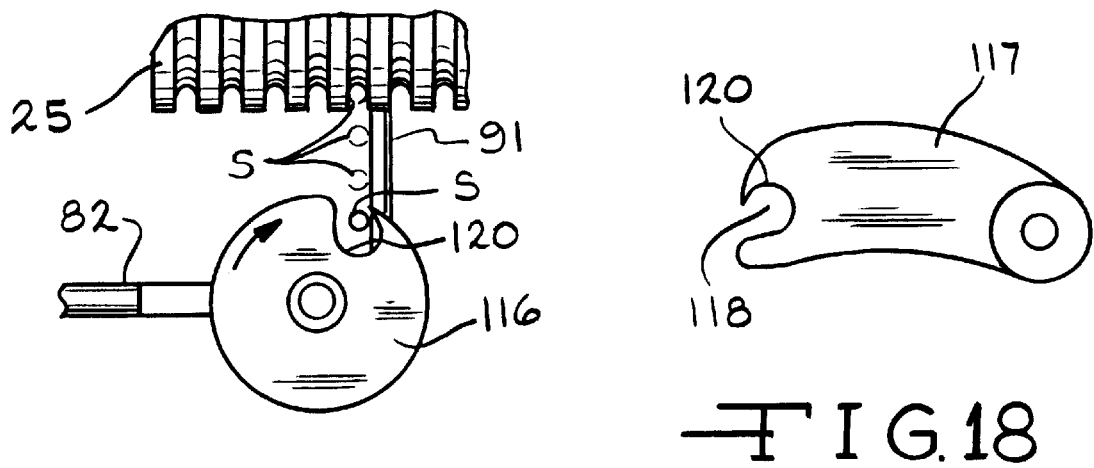
FIG. 17
FIG. 18

STRAND POSITIONING APPARATUS

This application is a continuation in part of application Ser. No. 08/960,119 filed Oct. 27, 1997, now U.S. Pat. No. 5,935,289 issued Aug. 10, 1999, which application was a continuation of application Ser. No. 08/604,695 filed Feb. 21, 1996, now abandoned, which was a continuation-in-part of application Ser. No. 08/296,212 filed Aug. 25, 1994, now abandoned. This invention involves apparatus for receiving, moving and positioning a strand, fiber, cable or wire and a method of using the apparatus to make products like chopped glass fiber strand. The apparatus is particularly suited to handling and positioning a strand of fibers such as glass fibers.

In the manufacture of chopped fiber strands it is typical to pull a plurality of strands, each containing a large number of fibers, at a high rate of speed with a chopping device to attenuate the fibers to the desired fiber diameter and to chop the strands of fibers into desired lengths. Such processes are disclosed in U.S. Pat. Nos. 3,815,461, 4,194,896 and 4,576,621. Normally, 5–15 strands are pulled by the chopper. To prevent the strands from bunching up and being cut by only a small length of the blades in the chopper it is known to use a strand separating guide roll having grooves or ridges and valleys on the surface for holding one or two strands, for keeping the strands separated and for guiding the individual strands into the chopper to present a spread out, uniform array of fiber strands to the chopper blades. This improves the quality of the chopped strands and increases the life of the chopper blades.

In a typical fiber glass operation an operator would stand below and in front of a fiber forming bushing that has broken out and needs to be restarted. If a part of the bushing is still running good fibers, the operator would break out that portion. As soon as all of the tips have beaded out and primary fibers are being generated from all of the tips, the operator gathers the array of fibers together into a bundle or strand, cuts or breaks the strand to form an end and pulls the fiber array against a sizing applicator and the strand under a pad wheel or guide with a curved surface below the bushing and walks the strand, pulling it, down to a puller, such as a chopper or winder, and feeds it into the pulling mechanism whereby the strand is pulled at the proper speed and chopped continuously into chopped fiber product or wound into a continuous strand package for use in making reinforced plastics, non-woven fiber glass mats, etc. In a typical operation each operator may have responsibility for 10 to 30 or more bushings and each bushing start may require walking at least 20–40 feet to get the strand to the puller or chopper, and in some instances, to the winder, and to walk back to the position or the next position needing attention or starting.

With many bushings typically breaking out (at least 20 fibers broken) at least 0.5–4 times per hour or more, especially when the glass quality varies from normal, the operator either doesn't have time to restart each bushing as soon as necessary for most efficient operation, or the operator becomes tired and doesn't get the fibers from the bushings restarted timely. This resultant loss of efficiency and the desire to reduce the labor costs in this process makes it desirable to reduce the work load of the operator wherever possible.

One operation that takes a lot of the operators time presently is to restart the strands from all of the bushings feeding that chopper after that chopper is started back up after a shutdown for rebuilding or repair. The backup roll, blade roll and other parts are wearable and must be replaced as often as every shift depending upon the type of product being made. Additionally, the chopper can malfunction due to the failure of some component and must be repaired. Until the present invention, when a chopper shuts down or was shut down, the operator would break out each strand below the bushing and allow the bushing to "hang", i.e. allow the primary fibers to flow continuously into the waste system in a level below the chopper level. When the chopper had been repaired and restarted it is desirable to get all of the strands from the bushings in the hanging mode running back into the chopper as soon as possible.

When starting a new strand of fiber into the chopper it is not practical to try to get the strand into the proper groove or valley on the strand separator roll because of the necessity of keeping the strand moving and because of the difficulty of aligning the strand with the proper groove or valley while on the move with the strand. Instead, the new heavy strand of primary fibers is placed in a wider start up valley or pulley wheel to start the strand. After the strand has started into the chopper the operator, with his bare fingers or hand, moves the strand out of the start up valley and over to a position adjacent the proper valley or groove on the strand separator roll and releases the strand into the proper valley. While he is doing this the strand is sliding over his skin at a speed of from 30 to over 60 miles per hour. This results in frequent injury to fingers and hands due to glass splinters, elongated beads and broken filaments being imbedded into the palm of the hand or fingers by the moving strand. Wearing gloves or other protective gear does not avoid these injuries, but makes the operator less efficient and less effective in the strand starting process. In a typical glass fiber chopped strand operation an operator, at times, has to start as many as 30 or more new strands per hour and averages starting about 5–15 new strands per hour.

It has long been desired to eliminate the need for an operator to move the strand using his hand or fingers to make the job safer, to eliminate annoying and sometimes painful injuries caused by this technique and to improve the productivity and efficiency of the operation, but nothing has been available to solve the problem. Something that would eliminate this task of the operator could also be used to position other strand like objects like wire, cable, fiber, etc. in other operations.

SUMMARY OF THE INVENTION

The present invention comprises a strand positioning apparatus for positioning a running item such as a strand of fibers, a fiber, wire, string, rope, cable or similar object into a predetermined position such as in desired groove or valley on a guide comprising a holder, preferably a curved surface, for the running item (strand), a transporter for moving the strand holder to the proper location and a mechanism for releasing the strand into the desired valley or groove in the surface of a strand separator roll, guide, or equivalent. Several configurations of strand holders are suitable so long as the holder is convenient to place a moving strand into quickly, does not damage or interfere with a moving strand, and reliably releases the strand when activated to do so. The transporter for moving the strand holder can be of various types so long as it moves the holder at a controlled rate and stops the holder at a precise predetermined location upon command. In one embodiment, the strand holder is a V or U grooved wheel that can be pivoted upward to release the strand against a vertical strand guide which guides the strand into the desired valley on the strand separator roll.

In another embodiment the strand holder is a circular disc having a slot that communicates with the periphery of the disc. The disc can be rotated to align the slot with the new strand and then moved to cause the running new strand to enter the slot. The disc is then rotated to move the strand either downwardly or upwardly to remove the strand from a starting groove in either the separator roll or some other starting strand guide. Once the strand is in the slot the disc is moved to the appropriate spot to align a vertical strand guide with a desired valley on the separator roll and the disc is rotated to move the open end of the slot to a position where the running strand will exit the slot, contact the vertical strand guide and slide into the desired valley on the separator roll.

The mechanism for releasing the strand works in conjunction with the strand holder and can be of various configurations so long as it functions accurately and reliably. The strand positioner apparatus can also comprise a strand guide that assists in guiding the strand into the desired groove or valley when released from the strand holder.

The present invention also includes a method of making chopped strand, fiber, wire, string, etc. using the strand positioners described above. The invention eliminates a risky manual task and frees the operator to attend to other process needs. When the term "supporting a new running strand" is used herein it is also intended to include "holding" a new running strand.

BRIEF DESCRIPTION OF THE DRAWINGS

FIGS. 15, 16 and 17 are partial side views of the embodiment shown in FIGS. 13 and 14 showing different stages of operation in repositioning a strand.

FIG. 18 is a frontal view of an alternative strand holder that can be used on the embodiment shown in FIGS. 13–17.

DETAILED DESCRIPTION OF THE INVENTION

The present invention can be used in a variety of processes to make a variety of products as will be readily recognized by the skilled artisan after reading this disclosure. For purposes of illustrating the invention and its use, the process of making chopped strand is chosen.

Figure 1:
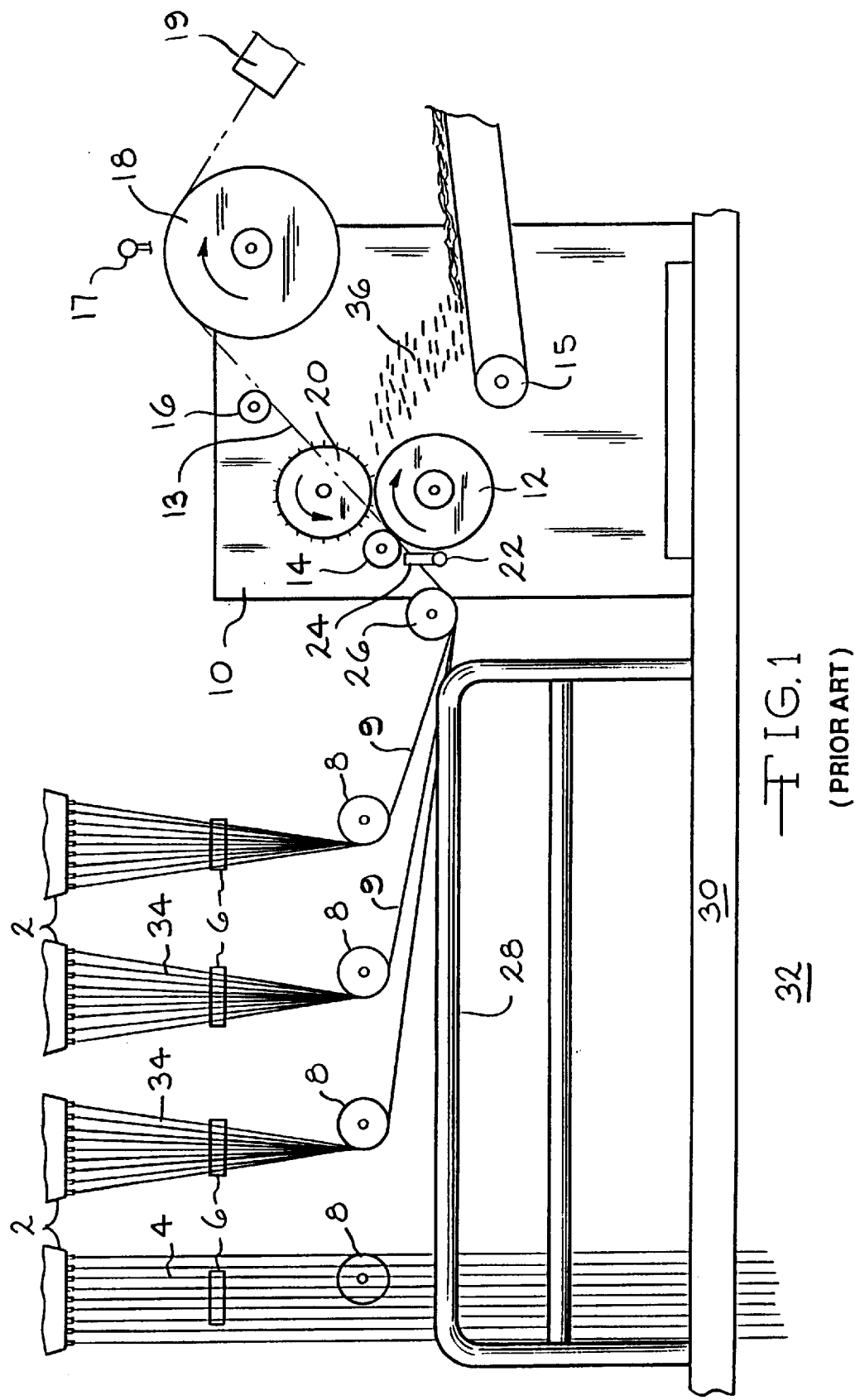
FIG. 1 is an elevational view of a typical prior art system and operation for making chopped strand showing a strand separator roll.

FIG. 1 shows a pertinent portion of a typical prior art system for making chopped strands, such as chopped strands of glass fibers. Molten glass is fed from a furnace and forehearth (not shown) into a plurality of electrically heated fiberizing bushings 2 or fiberizers. Each fiberizer 2 has a plurality of holes or tips in a plate in the base of the fiberizer 2 through which molten glass flows to form primary fibers 4 which move slowly downwardly in the direction shown. To convert the primary fibers 4 to fibers of a much smaller desired diameter it is necessary to pull the fibers at a high rate of speed to attenuate the fibers near the bottom of the fiberizer 2 where the fibers are still molten or stretchable. In the chopped strand system this is done by a chopper 10.

Figure 2:
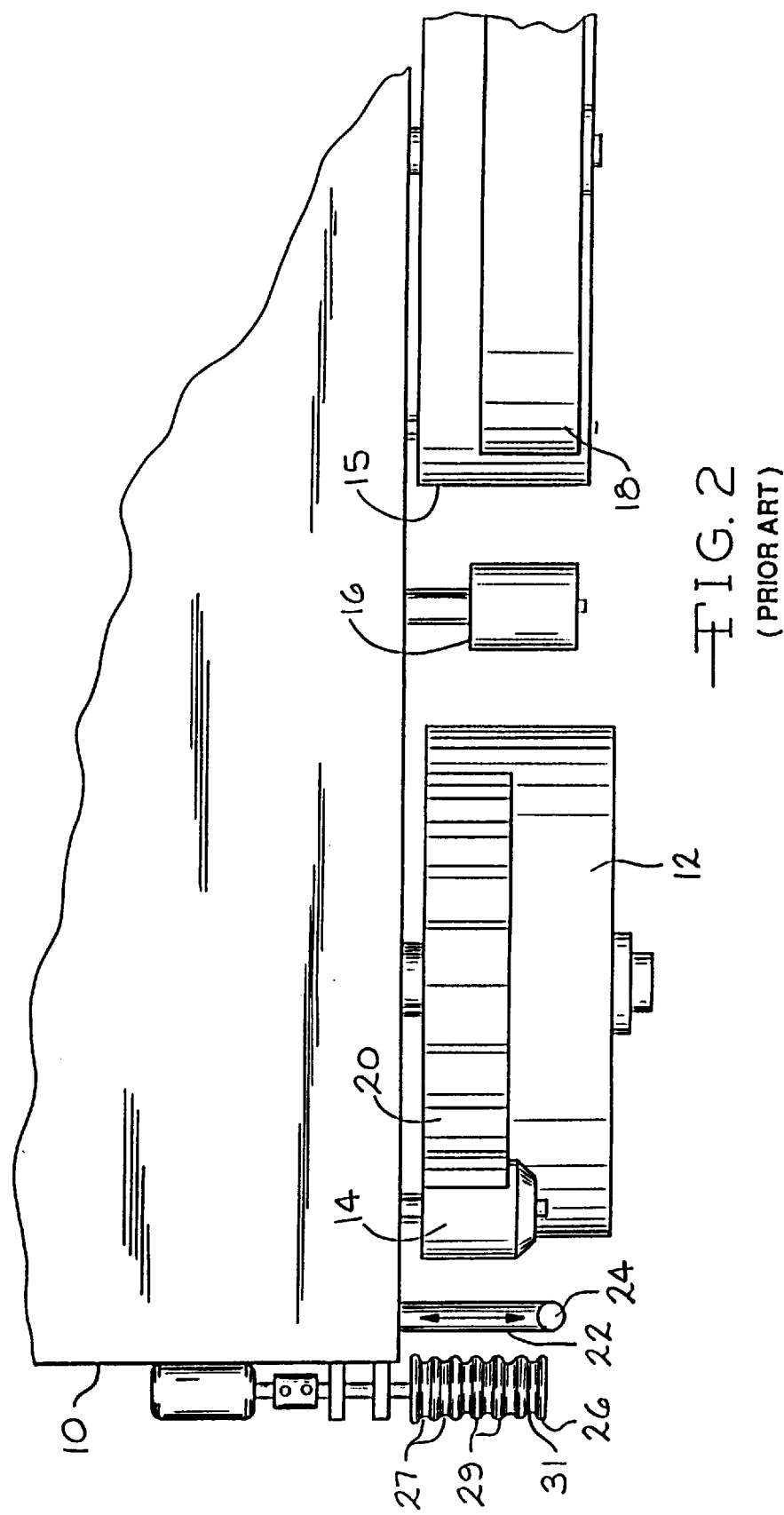
FIG. 2 is a plan view of a portion of the system shown in FIG. 1 showing the strand separator roll having valleys to contain and guide moving strands into a chopper.

Below each fiberizer 2 is a sizing applicator roll 6 for applying a known chemical sizing to the surface of the fibers in a known manner when they are being pulled. Also below each fiberizer 2 is a turning or pad wheel 8 for turning and guiding a strand 9 of fibers in a generally horizontal direction toward the chopper 10. A strand separator guide roll 26 is located between the pad wheel 8 closest to the chopper 10 and the chopper 10 to keep the strands 9 separated as they enter the chopper 10. As seen in FIG. 2, the guide roll 26 has valleys 27, one for each strand, between ridges 29 and an outer valley 31 for a new strand 13 to run in during start up of the new strand 13.

The chopper 10 comprises a frame (not shown), a back up roll 12, an optional pulling roll 14 and a blade roll 20. The optional pulling roll 14 cooperates with the back up roll 12 to pull the strands 9 when the wrap of the strands around the back up roll prior to the blade roll 16 is insufficient to create enough grip on the strands 9 to pull them into the nip between the back up roll 12 and the blade roll 20. The surface of the back up roll 12 is somewhat soft and cooperates with the blades in the blade roll 20 to chop the strands into the desired lengths in a known manner. The chopped strands 17 are collected and transported away by a conveyor 15.

The chopper 10 also comprises a start up accelerator roll 18, an optional guide 16, a flipper switch 17 and a chute 19, a finger 24 and a finger cylinder 22 for starting up a new strand 13. Each time a new strand 13, which can be from any of the fiberizers 2, is started into the chopper 10 it is necessary to accelerate the new strand 13 up to the pulling speed of the strands 9 that are being chopped before putting the new strand 13 into the nip between the backup roll 12 and the blade roll 20. Once the new strand 13 has been accelerated to the proper pulling speed by the accelerator roll 18, which is usually triggered by a fixed time after the flipper switch 17 has been activated, the finger 24 is moved towards the body of the chopper 10 by retraction of cylinder 22 to move the new strand 13 into the nip between the backup roll 12 and the blade roll 20 where it is chopped and becomes a running strand 9.

After the finger 24 has pulled the new strand 13 into the nip between the puller 14 and the chopper roll 20, the cylinder 22 extends to return the finger 24 to its waiting position beyond a plane that passes through an outer vertical face of the backup roll 12. Also, the new strand 13, which is now being chopped but continues to run in the start up valley 31 on the separator roll 26. The tail of the new strand 13 is fed into the waste chute 19 by the accelerator roll 18 to go to the waste hopper or system. In the past the new strand 13 is then moved into the appropriate valley 27 by the operator using a finger or the palm of his hand to move the running new strand 13 down out of the valley 31 and over and up into the appropriate valley 27.

Figure 3:
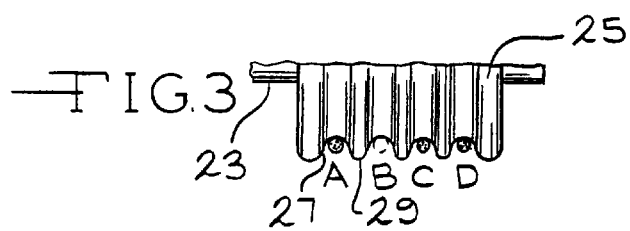
FIG. 3 is a partial plan view of the strand guide roll shown in FIGS. 1, 2 and 4.

The present invention positions the new strand into the proper valley 27 of the strand separator roll 26 mechanically and automatically, freeing the operator to do other things and making the operator's task much safer. Referring to FIG. 3, a partial view of a strand separator roll 25 is shown. The separator roll 25 is preferably different in design than the separator roll 26 shown in FIG. 2 by not having the valley 31 used for the start up strand. The roll 25 is fixed and supported on a slowly rotating shaft 23. The valleys 27 are labeled A through D, for a line containing only four bushings. Strands are running in valleys A, C, and D. The step of moving a new strand to its proper position on the separator roll 25, in this case valley B, is done mechanically and automatically with a novel strand positioning apparatus.

Figure 4:
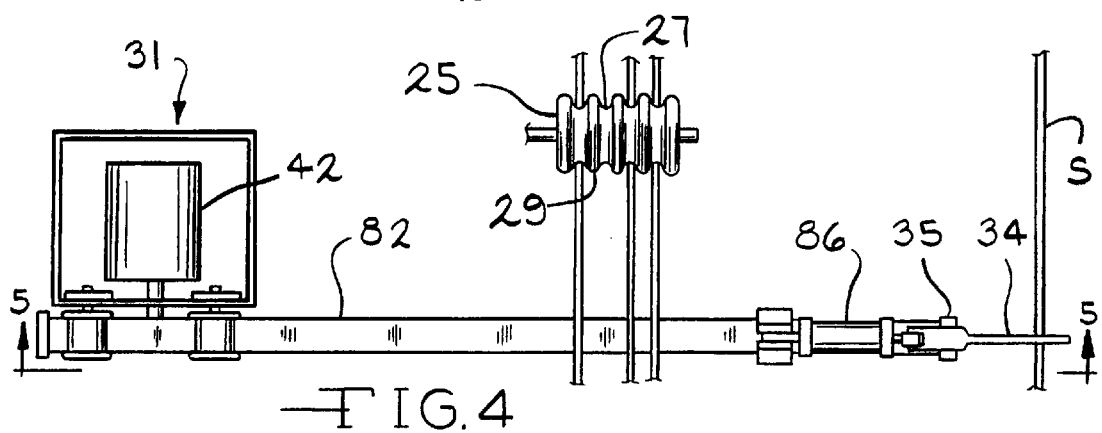
FIG. 4 is a plan view of the apparatus shown in FIG. 3.
Figure 5:
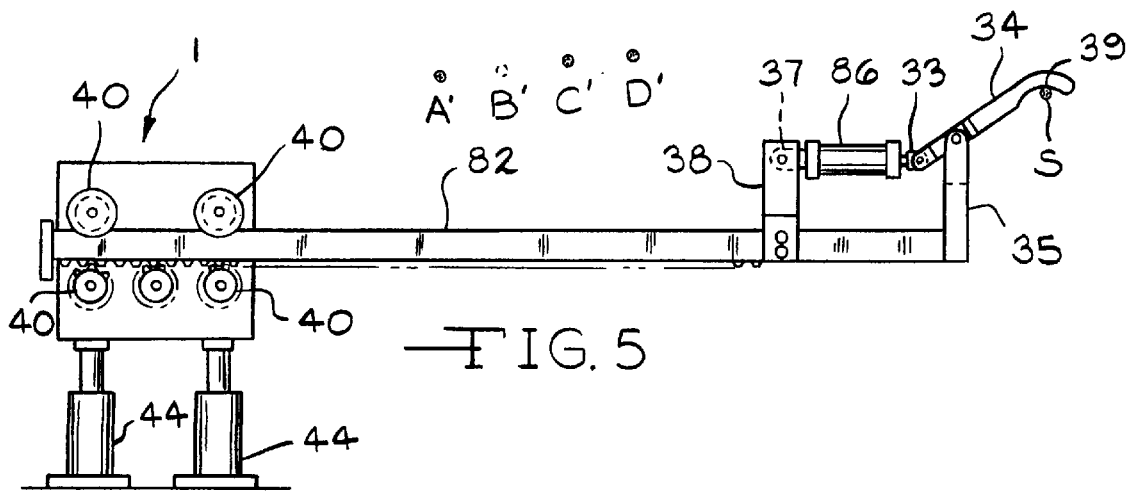
FIG. 5 is a front view of one embodiment of a strand positioner of the present invention.
Figure 6:
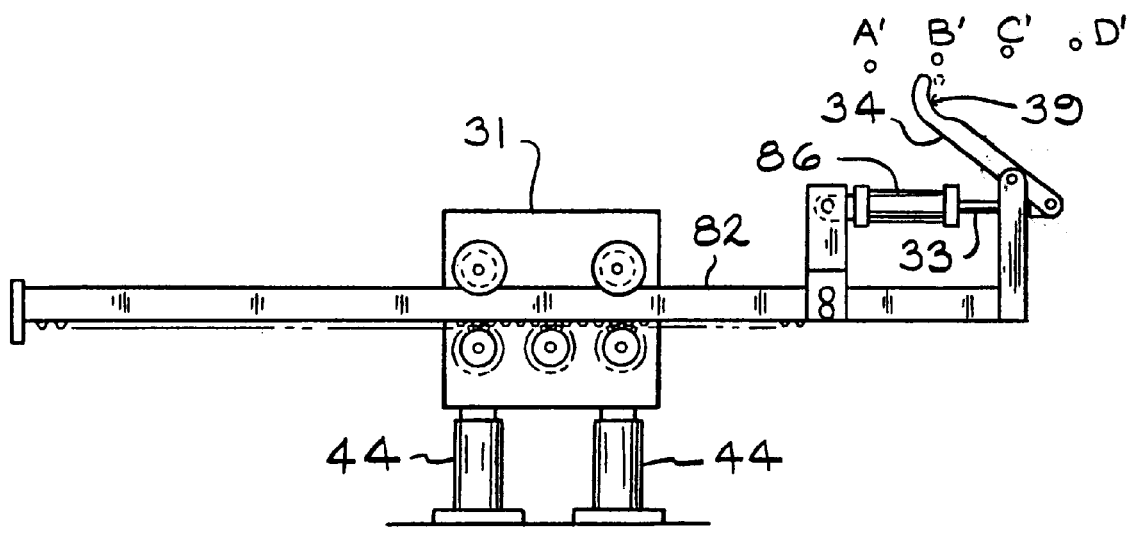
FIG. 6 is a front view of the apparatus shown in FIG. 3 in a strand releasing position.

FIGS. 4–8 show strand positioning apparatus of the present invention, and operation for accepting a starting strand and for moving the strand to the appropriate valley on the strand separator roll 25. FIG. 4 is a plan view of a portion of the forming room between the strand separator roll 25 and the bushing position nearest the chopper 10. The strands are in the same positions as they are in FIG. 3. A strand positioner assembly 31 is located close to the chopper and separator roll 25, preferably lower than the separator roll, but this is not necessary. The strand positioner assembly 31 comprises a generally horizontal arm 82, preferably being a gear toothed rack with the teeth on the underneath side and having on one end a strand holder member 34 curved slightly at its extremity to form an eye 39 for receiving and holding a running strand. The member 34 is pivotly coupled at a point along its length to a fixed vertical member 35 and, at its opposite end to a rod 33 of an actuator 86. The actuator 86 can be an electrical solenoid, an air cylinder or other actuating device and is attached to a clevis mount 37 which in turn is pivotly attached with a pin to a second vertical member 38, rigidly attached to arm 82. Assembly 31 further comprises a geared stepping motor 42 cooperating with the teeth in arm 82 to move strand holder 34 back and forth in a horizontal direction, a plurality of rack guide rolls 40, optionally one or more vertical positioners 44 (see FIG. 5), and a control system with memory (not shown). As shown in FIG. 5, the strands A', C', D', with B' shown in phantom for where it will be placed, are spaced apart, on an incline or are at this location, above the path of eye 39, as shown in FIG. 4.

The control system can cause the strand holder eye 39 to be moved perpendicular to and beneath the running strands and knows where the strand holding eye 39 of member 34 is at all times using an X axis sensing and control system. The control system also knows where the positions A'–D' are on the X axis, and optionally can be designed to also know where these positions are vertically, or on a Y axis. Optionally, beneath the positioner 31 is one or more vertical positioners 44 that operate with a Y axis sensor and control system and the control system has programmed into its memory where the eye 39 should be vertically to receive a new a strand 13 (FIG. 1) or S (FIGS. 4, 5, and 7, and to later release this strand into the appropriate valley 27 to become a normal running strand 9.

When the operator goes to a hanging bushing requiring strand restart, he pushes a button located at each bushing position that sends a signal to the memory of the control system for positioner 31 which indicates the number or letter of the bushing and the valley 27 to position the next strand in on the separator roll 25, and which also actuates the stepper motor 42 and actuator 36 to place eye 39 into the position shown in FIGS. 4 and 5.

After a new strand has been placed in eye 39 and placed over or onto the accelerator roll 18, and when a signal is sent to move finger 24 back into its normal position, a signal is also sent to the positioner 31 to move eye 39 and the new strand 13 or S to the proper position for releasing the new strand into valley B, or the proper valley 27 for the strand as stored in the control system memory. Once eye 39 is in this location, the control system stops stepper motor 42 and signals the activator 86 extending rod 33 which pivots eye 39 to the position shown in FIG. 6, allowing the strand S, or 13, to release from eye 39 and slide up into position B' and into valley B of the separator roll 25. The strand is shown in phantom positions to show the path it moves in as it slides into position B' (B prime).

While this automatic strand positioning apparatus has been shown with a manual strand starting operation, this invention can also be used to improve an automatic or mechanical strand starting system of the type disclosed in U.S. Pat. No. 5,935,289. Manually moving the strands into position on separator roll 26 is a safety hazard because occasionally a hot bead or sliver gets caught in a strand and can hit an operator's hand at up to sixty miles per hour or faster causing burns and/or a sliver to be driven into a finger and even finger bone. Also, if the strand is dry because of failure of the pot sprays or failure of the sizing applicator to size the fibers, the rapidly moving dry strand is very abrasive and will burn or cut ones hand or fingers.

Figure 7:
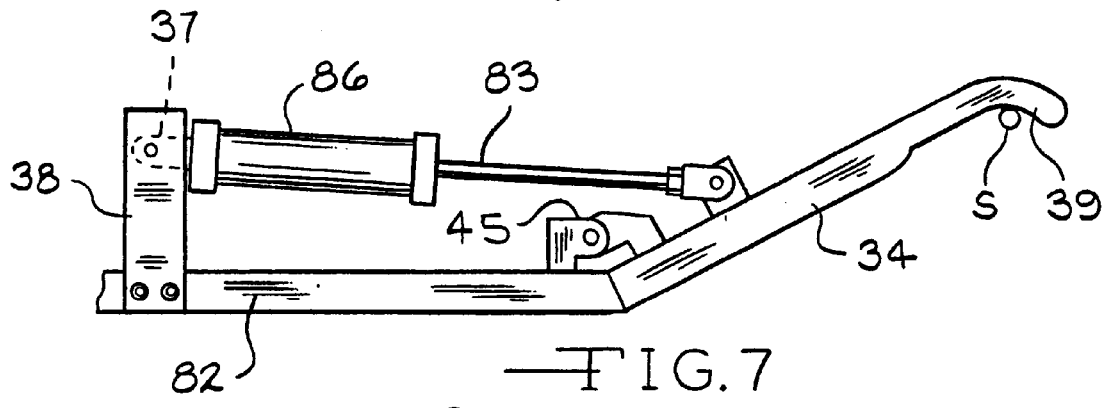
FIGS. 7 and 8 show a strand releasing mechanism in a strand starting position and a strand releasing position respectively.
Figure 8:
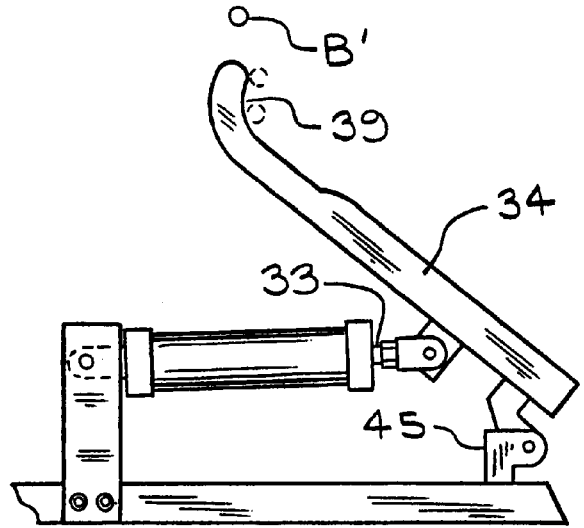

Although the vertical positioner 44 is not necessary, it can be used to enhance the performance of the strand positioner apparatus, particularly where many bushings and strands are present in each fiberizing line, such as ten or more. The vertical distance between the first and last strand in the plane of the movement of eye 39 will be much greater when many strands are present. It will be readily seen that several other known devices can be used to modify this apparatus to reposition a newly started strand in the manner disclosed here and it is within the ordinary skill of the art to do so. For example, vertical member 38 could be eliminated by attaching pivoting member 34 on the end portion of arm 32 using a hinge 45 as shown in FIGS. 7 and 8.

Figure 9:
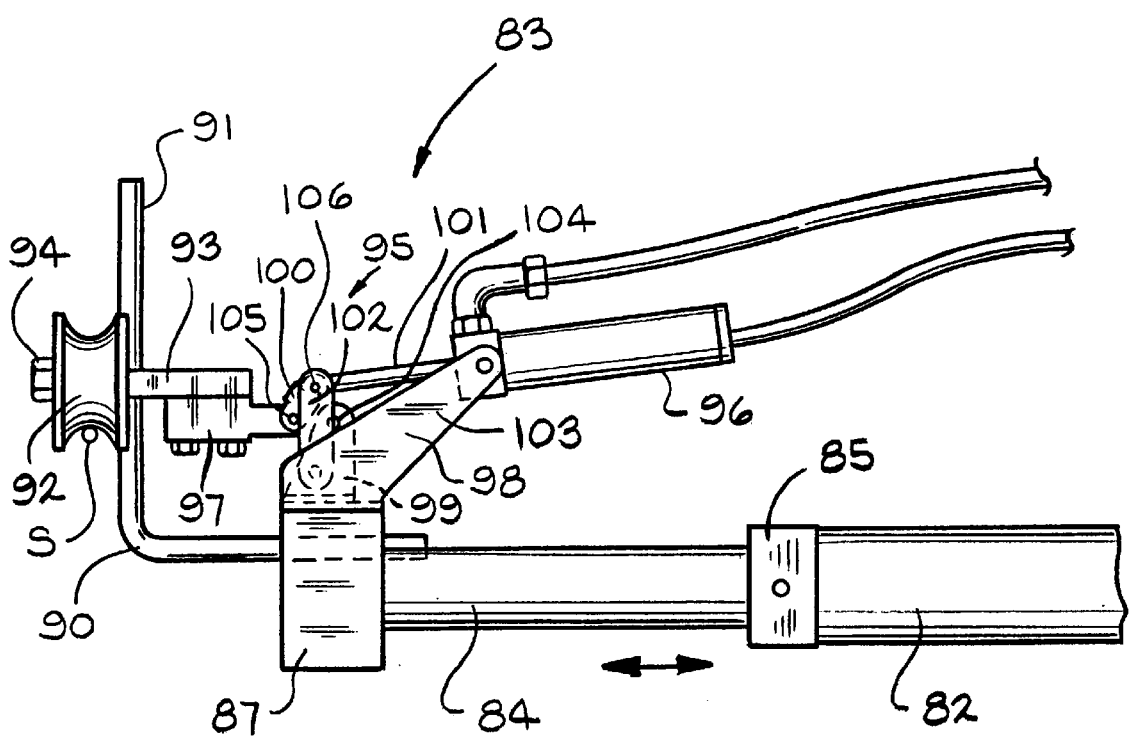
FIG. 9 is a side partial view of a preferred embodiment of the invention in position to receive a new strand being started into a device such as a chopper.
Figure 10:
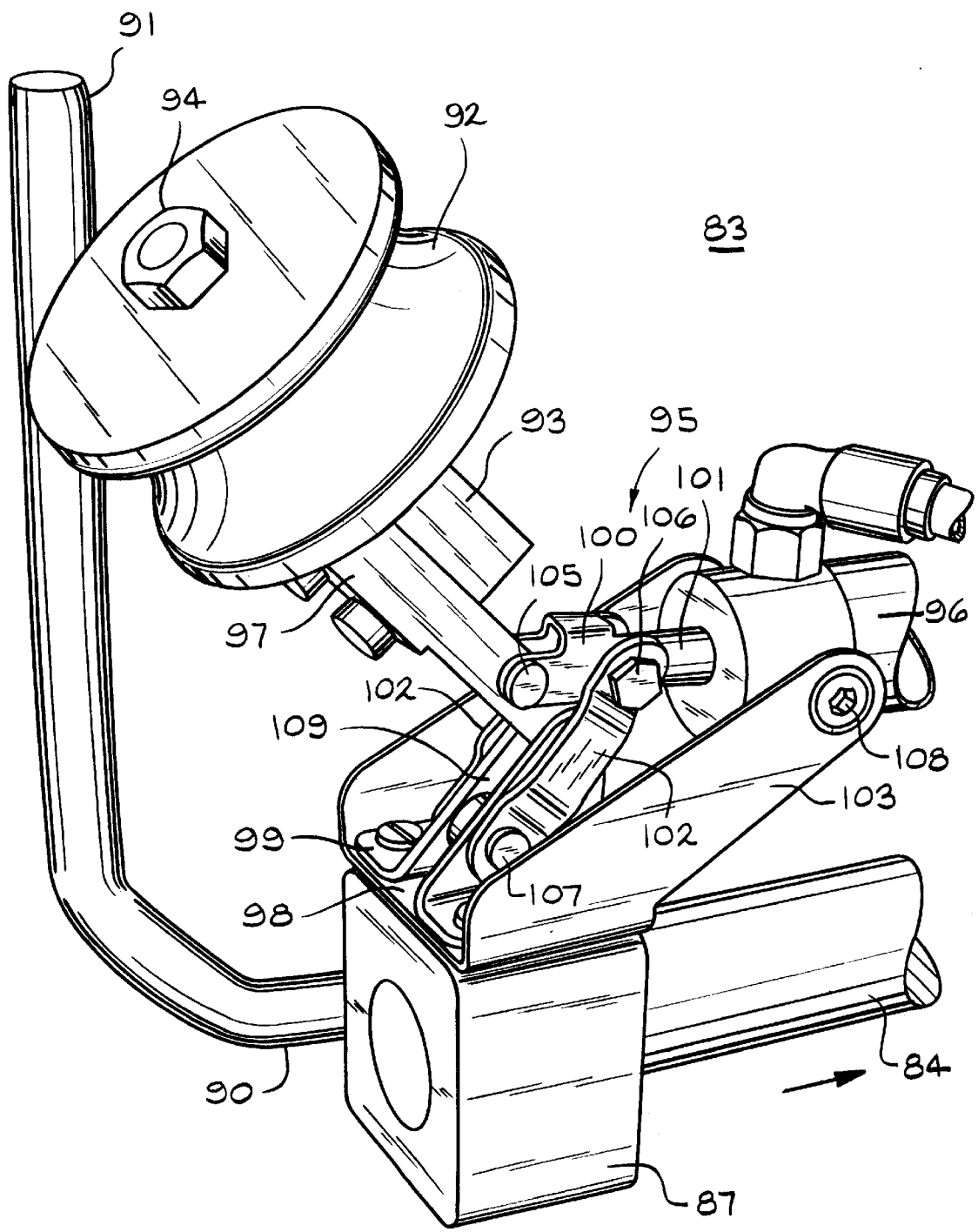
FIG. 10 is a perspective close-up view of a portion of the preferred embodiment in a position to release a strand showing elements in detail.
Figure 11:
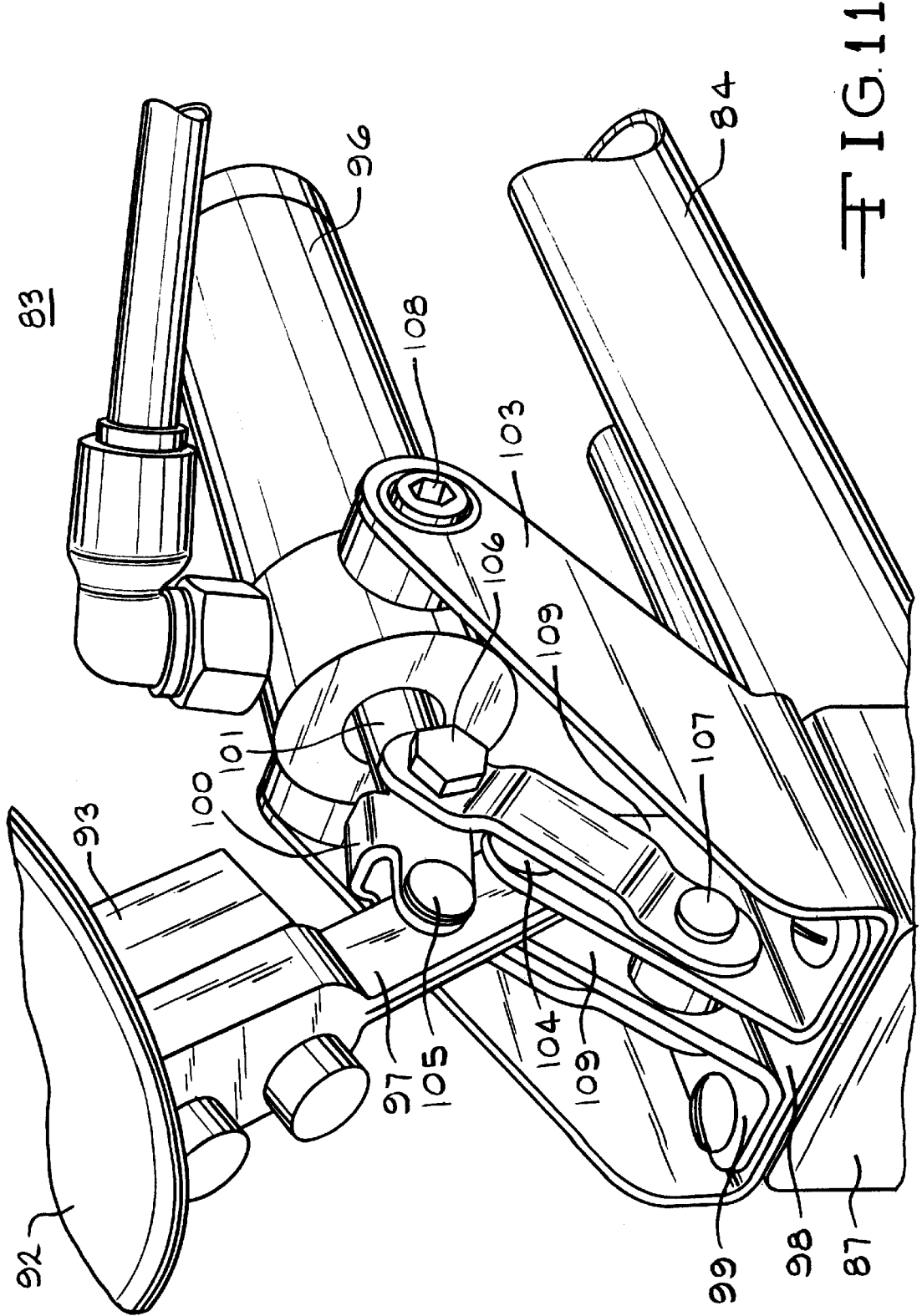
FIG. 11 is a close-up perspective view of the preferred embodiment in a strand releasing position showing elements in detail.

FIGS. 9–12 show a preferred embodiment of the invention which is a modification of the embodiment disclosed in FIGS. 4–8. The modification is in the strand holder mechanism 83 for holding a new running strand and for later releasing the new strand 13 into the appropriate valley 27 of the separator roll 25. A side view of this embodiment is shown in FIG. 9. This strand positioning apparatus differs from that described above only with the strand holder and releasing mechanism 83 attached to the arm 82. In this embodiment, an extension arm 84 is attached to arm 82 with a coupling 85 that slips over both the arm 82 and the extension arm 84 and grips both with the aid of a one or more tightening screws in a known manner. A mount 87 is preferably attached to the other end of the extension arm 84 in any known manner, such as with (not shown) threaded into the mount 87.

In this preferred embodiment a number of things are attached to the mount 87. First, a strand guide rod 90 having a vertical portion 91, preferably made of brass or stainless steel, is mounted to the block in any known manner. The guide rod 90 is preferably bent such that the vertical portion 91 is located where the new running strand S will be released from a U or V shaped grooved wheel 92 when the axis of the wheel 92 is tipped up to an angle of 45 degrees or more (see FIG. 10). The wheel 92 is preferably made of graphite or brass filled graphite or Micarta®. The wheel 92 can rotate freely on an axle 93 and is held onto the axle 93 with a washer and nut 94. In the strand starting position, the axis of the wheel 92 is in a generally horizontal position as shown in FIG. 9.

Figure 12:
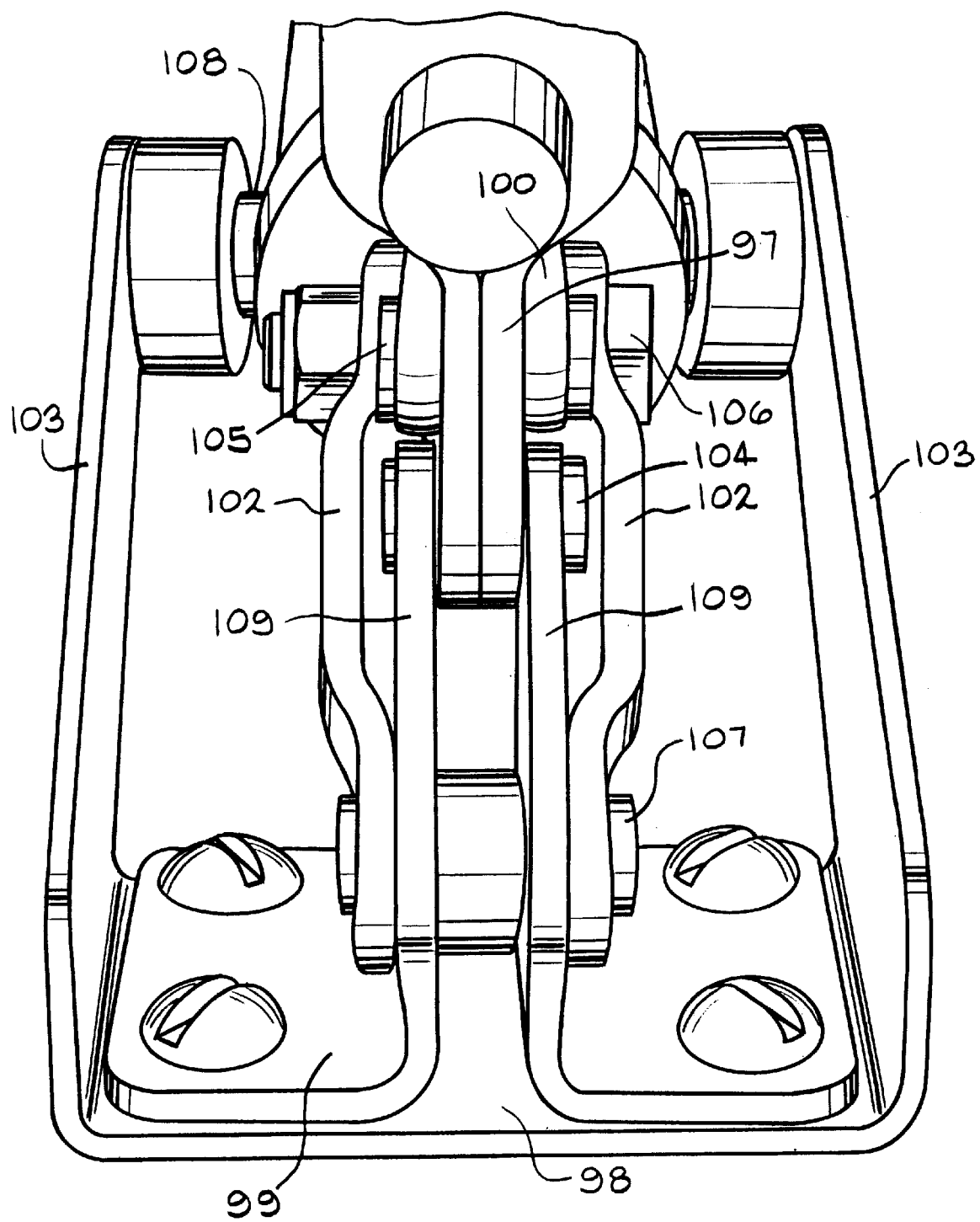
FIG. 12 is a partial end view of the preferred embodiment in a strand releasing position.

The axle 93 of the wheel 92 is held and manipulated by a pivoting mechanism 95 driven by a fluid, preferably air, cylinder 96 having a cylinder rod 101. The pivoting mechanism 95 is attached to the mount 87 in any known manner, such as is shown in FIG. 12. In addition to the driver cylinder 96, the pivoting mechanism comprises an optional mounting arm 97, an outer bracket 98, an inner bracket 99, a clevis 100, one or two links 102 and various pins to be specified later to attach these parts together in a pivoting manner. Instead of the pivoting mechanism 95 shown, any mechanism that will pivot or tip the wheel 92 in the manner shown can be used in the present invention.

In the preferred embodiment shown, wheel axle 93 is attached to the optional mounting arm 97 in any known manner, such as with bolts as shown. The other end of the mounting arm 97 is attached to the top portion of the inner bracket 99 with a pin 104, see FIG. 11, such that the mounting arm 97 can pivot around the pin 104. Also attached to the mounting arm 97, close to the pin 104 and between the pin 104 and the wheel 92, is one end of the clevis 100 in a pivoting manner with a pin 105 (see FIG. 10). The mounting arm 97 is optional because wheel axle 93 can be made to attach directly to the top portion of the inner bracket 99 if desired and in that case the items attached to the mounting arm 97 would be attached to the axle 93 instead.

The outer bracket 98 sets on top of the mount 87 and the inner bracket 99 sets on top of a base of the outer bracket 98 and is within two bracket arms 103 of the outer bracket 98. The bracket arms 103 are spaced apart such that preferably the remainder of the pivoting mechanism 95 is between the planes made by inner surfaces of the bracket arms 103. The fluid cylinder 96 is mounted within an upper portion of the bracket arms 103 in a pivoting manner with pins 108, each of which passes through a hole in the upper portion of one bracket arm 103 and into a casing or mount on the front end of the cylinder 96.

The inner bracket 99 also has two arms 109 which are shorter than the bracket arms 103 of the outer bracket. The two inner bracket arms 109 are spaced apart enough to allow the mounting arm 97 to pivot within their inner surfaces. The top of the inner bracket arms end below the bottom of the cylinder rod 101.

The other end of the clevis 100 is attached to the end of the cylinder rod 101 in a pivoting manner with a pin 106. Preferably the two links 102 are attached to the lower portion of the inner bracket 99, one link 102 on each side of the mounting arm 97, with a pin 107 in a pivoting manner and the other end of the links 102 are attached in a pivoting manner to the pin 106 that passes through a hole near the end of the cylinder rod 101. The two links 102 can optionally be replaced with a one piece bracket or clevis which would allow the links 102 to be made in a single piece of material in a known manner.

When using the preferred embodiment of FIGS. 9–12, the operator goes to the bushing he will be starting a strand from and he pushes the button there that sends a signal to the memory of the control system for positioner 31 which indicates the number or letter of the bushing and the valley 27 to position the next strand in on the separator roll 25. This signal also actuates the stepper motor 42 and actuator 86 to place wheel 92 into the position shown in FIG. 9.

After a new strand has been placed in the U or V shaped groove in wheel 92, it is then threaded into the strand processing device like the chopper 10 and placed over or onto the accelerator roll 18. After the finger 24 has moved the new strand into the nip between the blade roll 20 and the back up roll 12, a signal is sent to the positioner 31 to move the wheel 92, the vertical portion of the guide rod 91 and the new strand 13 to the proper position for releasing the new strand S into the desired valley 27 for the strand S, as stored in the control system memory. Once wheel 92 is in this location, the control system stops stepper motor 42 and opens a conventional fluid valve (not shown) which allows compressed air to enter the rod end of the cylinder 96 withdrawing the cylinder rod 101 which, with the pivoting mechanism 95, pivots the wheel 92 to the position shown in FIG. 10, allowing the strand S to slide up the U or V groove of the wheel 92 and against the surface of the vertical strand guide 91 and into the desired groove 27 of the separator roll 27. The pulling of the new strand S by the chopper 10 causes the new strand S to move in this direction to the desired valley 27 in the separator roll 25 and the presence and location of the vertical portion 91 of the strand guide rod 90 guides the new strand S into the proper valley.

Figure 13:
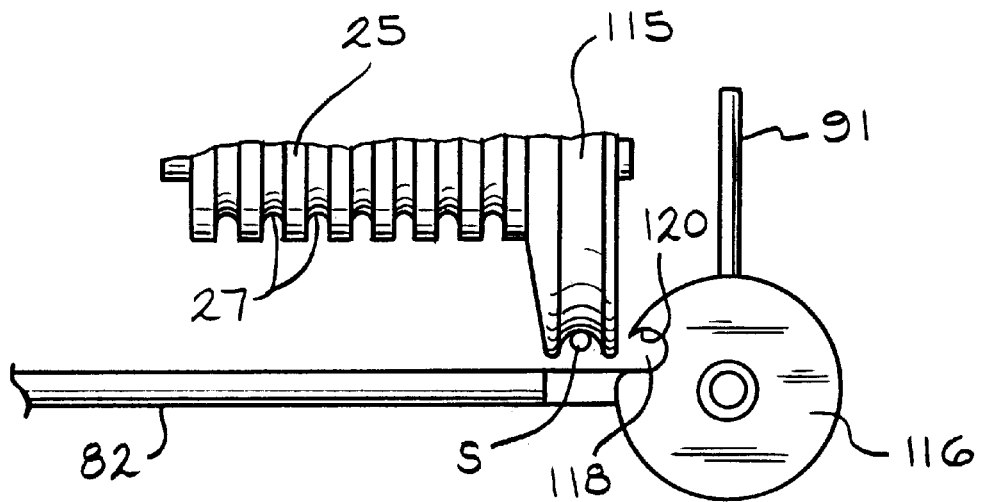
FIG. 13 is a partial side view of another embodiment showing a different device for receiving a new strand, holding a running strand, and releasing the running strand.
Figure 14:
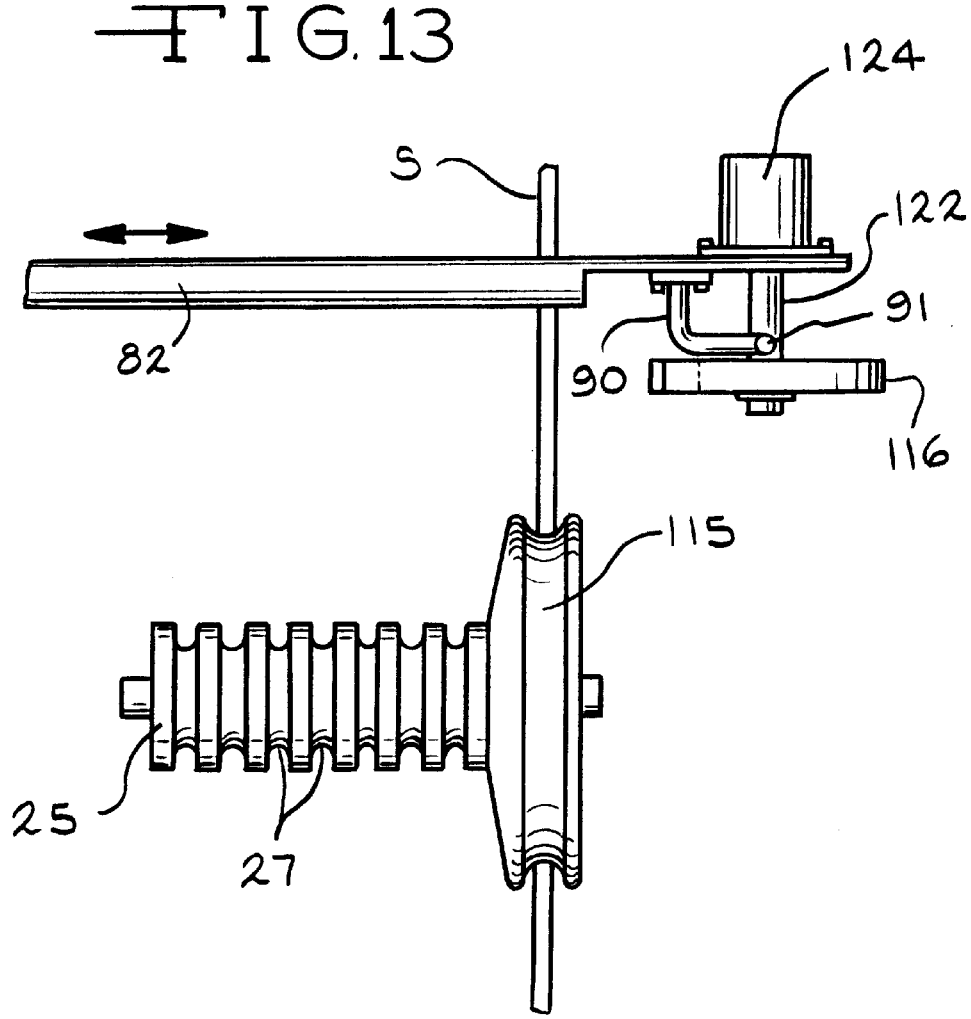
FIG. 14 is a partial plan view of the embodiment shown in FIG. 13.

In another modification a strand separator roll similar to the roll 26 shown in FIG. 2, but preferably modified as shown in FIGS. 13 and 14 by having an enlarged diameter valley 115 for starting the new strand in is used for starting the strand instead of the eye 39 or the wheel 92. In this case the control system for the positioning apparatus 31 would use rotation of a disc 116, or an arm or portion of a disc 117 (see FIG. 18), having a generally circular slot or cutout 118 in the periphery of the disc to receive and hold the new running strand S, and preferably to remove the new strand S from the valley 115, before moving the strand S to its proper location for release. A strand contacting surface 120 of the slot 118 is preferably convex in shape to produce a curved surface to contact the new running strand to reduce the area of contact and to minimize frictional drag on the strand. The disc 116, or the portion of a disc or arm 117, is mounted in a rotational manner, preferably on an axle 122 connected to a stepper motor 124 mounted near the end of the arm 82. The strand guide rod 90 having a vertical portion 91 is also mounted to the arm 82 as the earlier described embodiment.

When the new strand S has been moved into the chopper 10 and is being chopped, a signal is sent to the positioner 31 to move the disc 116 to the position shown in FIG. 15 such that the new running strand S moves into the slot 118. After reaching that point, a signal is sent to the stepper motor 124 to rotate the disc 116 counter clockwise to move the new running strand S downward out of the valley 115 and to the position shown in FIG. 16. At that time a signal is sent to the positioner 31 to move the disc 116 and the strand guide rod 90 to a point where the leading edge of the vertical portion 91 of the guide rod 90 lines up with an outboard edge of the desired valley 27 in the separator roll 25 as shown in FIG. 17. Finally, a signal is sent to the stepper motor 24 to rotate the disc 116 clockwise, or counter clockwise, to allow the new running strand S to slide up and out of the slot 118 and up the leading edge or surface of the vertical portion 91 of the strand guide rod 90 and into the desired valley 27 on the separator roll. At this time the disc is returned to the location and orientation shown in FIGS. 13 and 14 by the positioner 31 and the stepper motor 24.

Instead of using a disc 116 in this embodiment, only a portion of a disc 118 as shown in FIG. 18 or a strand holder of this same or similar shape can also be used. Also, instead of using a larger diameter valley 115 on the end of the separator roll 25 to hold the new running strand S until it is relocated to the desired valley on the separator roll by the present invention, it is possible for the operator to put the new strand he is starting directly into the slot 118 on the disc 116 or the arm or disc portion 117.

For all of the embodiments of the invention it is within the ordinary skill of the control systems designer having the benefit of this disclosure to design a control system to operate in the manner described above without using any inventive skill. Having the benefit of the above disclosure, it will be apparent to the skilled artisan that other obvious modifications can be made to the apparatus disclosed here and to the method of using the apparatus to make glass fiber products without changing the concept of the invention and those modifications are intended to be included within the scope of the following claims.

What is claimed is:

1. A running item positioning apparatus for supporting and moving the item running linearly at a speed of at least 30 miles per hour selected from a group consisting of fiber, string, strand of fibers, and wire from a first position on the apparatus to a second position which is one predetermined valley which can be any one of four or more different valleys in a guide or item separator that is spaced from a holder on the apparatus, said valleys having a function of guiding a plurality of running items, comprising the holder having a curved surface for receiving and holding the running item in the first position, a transporter comprising a drive for moving the holder horizontally, an arm for supporting the holder and a control system for causing the drive to move said arm to move said curved surface and the running item to or near said predetermined valley on said guide or item separator, said predetermined valley being any one of said four or more valleys and predetermined by a signal to said control system prior to said moving, and a mechanism for releasing said running item from said holder and into or near said predetermined valley whereby said running item moves into said predetermined valley.

2. A running item positioning apparatus for supporting, moving and releasing an item running linearly at a speed of at least 30 miles per hour selected from a group consisting of a fiber, strand of fibers, string and wire from one position on the apparatus to a predetermined valley selected from any one of four or more valleys on a guide or item separator that is spaced from a holder on the apparatus and having a function of guiding a plurality of four or more running items, said apparatus comprising:

a) the holder having a curved surface for receiving and holding said running item, b) a transporter for supporting and moving said holder and said running item to near said predetermined valley, said transporter comprising an arm for supporting said holder and a drive for moving said holder horizontally towards and away from said predetermined position, c) a control system comprising means for receiving a signal indicating which one of the four or more valleys is selected as the predetermined valley and for causing said drive to move the holder near the predetermined valley, and d) a mechanism for releasing said running item from said holder allowing said running item to move into said predetermined valley on said guide or item separator.

3. The apparatus of claim 2 wherein said holder is located on one end of a pivot arm that is mounted on said arm.

4. The apparatus of claim 3 wherein said transporter for moving said running item also comprises an actuator for pivoting said pivot arm to properly align and release said strand into said predetermined valley and to return said curved surface of said holder to a receiving position.

5. The apparatus of claim 4 wherein said control system comprises memory for storing information about the signal and later uses this information to control movement of said holder.

6. The apparatus of claim 2 wherein said holder for receiving and holding said running item is a wheel having a curved surface in the form of a U or V shaped valley in its periphery.

7. The apparatus of claim 6 wherein said transporter for moving said holder comprises members for holding said wheel in a position and location for receiving the running item and for pivoting said wheel to properly align and release said running item into said predetermined valley.

8. The apparatus of claim 7 further comprising:

e) a guide rod having a vertical portion for contacting and guiding said running item into said predetermined valley.

9. The apparatus of claim 2 further comprising:

e) a guide rod having a vertical portion for contacting and guiding said running item into said predetermined valley.

10. The apparatus of claim 9 wherein said control system comprises means for storing information about said signal and later using this information to control the movement of said holder by said drive.

11. The apparatus of claim 2 wherein the curved surface for supporting the running item is a part of a slot in a disc, portion of a disc or the arm.

12. The apparatus of claim 11 further comprising a guide rod having a vertical portion for contacting and guiding said strand into said predetermined valley.

* * * * *